United States Patent
Tsukamoto

(10) Patent No.: US 9,142,824 B2
(45) Date of Patent: Sep. 22, 2015

(54) PLATE-LIKE BATTERY PACK AND BATTERY PACK GROUP COMPOSED OF PLURAL PLATE-LIKE BATTERY PACKS

(71) Applicant: Connexx Systems Corporation, Kyoto (JP)

(72) Inventor: Hisashi Tsukamoto, Kyoto (JP)

(73) Assignee: CONNEXX SYSTEMS CORPORATION, Kyoto (JP)

( * ) Notice: Subject to any disclaimer, the term of this patent is extended or adjusted under 35 U.S.C. 154(b) by 86 days.

(21) Appl. No.: 14/184,045

(22) Filed: Feb. 19, 2014

(65) Prior Publication Data

US 2014/0349151 A1   Nov. 27, 2014

(30) Foreign Application Priority Data

May 23, 2013  (JP) ................. 2013-108572
Jul. 17, 2013  (JP) ................. 2013-148482

(51) Int. Cl.
| | |
|---|---|
| H01M 2/06 | (2006.01) |
| H01M 2/22 | (2006.01) |
| H01M 2/26 | (2006.01) |
| H01M 2/02 | (2006.01) |
| H01M 2/20 | (2006.01) |
| H01M 10/48 | (2006.01) |
| H01M 2/34 | (2006.01) |
| H01M 2/30 | (2006.01) |

(52) U.S. Cl.
CPC ............ *H01M 2/206* (2013.01); *H01M 2/0242* (2013.01); *H01M 2/266* (2013.01); *H01M 2/30* (2013.01); *H01M 2/34* (2013.01); *H01M 2/348* (2013.01); *H01M 10/48* (2013.01)

(58) Field of Classification Search
None
See application file for complete search history.

(56) References Cited

U.S. PATENT DOCUMENTS

| | | |
|---|---|---|
| 6,400,122 B1 * | 6/2002 | Iwamura .................. 320/107 |
| 2003/0091896 A1 | 5/2003 | Watanabe et al. |
| 2004/0076883 A1 | 4/2004 | Aoshima et al. |

FOREIGN PATENT DOCUMENTS

| | | |
|---|---|---|
| JP | 2003-007345 | 1/2003 |
| JP | 2003-151526 | 5/2003 |
| JP | 2012-178271 | 9/2012 |

* cited by examiner

*Primary Examiner* — Cynthia K Walls
(74) *Attorney, Agent, or Firm* — Muncy, Geissler, Olds & Lowe, P.C.

(57) ABSTRACT

A plate-like battery pack has: a plurality of single cell elements; a flat battery pack case composed of an insulating material and adapted to have a plurality of holes respectively housing the single cell elements; and a plurality of sealing plates adapted to hermetically seal the holes housing the single cell elements and connect adjacent ones of the single cell elements, and the sealing plates connect the single cell elements in series, parallel or series-parallel.

19 Claims, 8 Drawing Sheets

PLATE-LIKE BATTERY PACK AND BATTERY PACK GROUP COMPOSED OF PLURAL PLATE-LIKE BATTERY PACKS

BACKGROUND OF THE INVENTION

The present invention relates to a battery pack composed of assembled single-cell secondary batteries and a battery pack group in which the battery packs are connected in series, parallel or series-parallel.

Conventionally, there has been known a battery pack having a plurality of single cells connected in series, parallel or series-parallel in order to obtain a large capacity secondary battery. In addition, the significance of the battery pack is being rediscovered in recent years along with the popularization of electric vehicles and hybrid vehicles.

JP 2003-151526 A discloses an assembled battery which is constituted by combining a plurality of secondary battery single cells, which is produced by connecting the secondary battery single cells by bus bars and then processing the connected cells so as to be housed in an external case, and which improves resistance to vibrations and impacts from the outside while ensuring ease of productivity of the assembled battery and ease of workability in joining the bus bars and the like.

JP 2003-7345 A discloses a lithium secondary battery in which a flat case is constituted with a lightweight exterior material like a laminate film having a gas barrier layer and resin layers respectively provided on both faces of the gas barrier layer; and the flat case housing a battery element having positive and negative electrodes is hermetically closed.

JP 2012-178271 A discloses a technique to reduce the weight of a battery pack by shortening a terminal connecting member used to connect a positive terminal of one secondary battery to a negative terminal of the other secondary battery or by removing the terminal connecting member.

SUMMARY OF THE INVENTION

In the assembled battery of JP 2003-151526 A, the single cells are stacked and this configuration hinders heat dissipation, so that the performance of each single cell varies due to the heat, but there is no disclosure on this fact. JP 2003-7345 A discloses the configuration of a lithium ion cell but does not disclose the configuration of a battery pack composed of the lithium ion cells assembled.

While JP 2012-178271 A discloses the battery pack having single cells arranged in a flat manner, a battery pack case or the like required of the plural single cells to serve as one battery pack is not disclosed and therefore the inconvenience arises in handling the battery pack.

A first object of the present invention is to provide a battery pack in which, owing to an electrically-insulating flat battery pack case for housing a plurality of single cell elements and sealing plates of the single cell elements serving also as bus bars for connecting the single cell elements, the bus bar is light in weight, the battery connection resistance is low, the assembly process is simple, the heat dissipation properties are excellent, the performance of the single cell elements constituting the battery pack does not vary so that the battery pack can avoid degrading, and the handling is easy.

A second object of the present invention is to provide a battery pack group of high voltage in which plural battery packs according to the invention are connected through connecting bridges and in which, when experiencing an impact due to, for instance, an accident, the connecting bridges connecting the battery packs are disconnected so that the high voltage state is eliminated, thereby decreasing the risk of electrical shock caused by high voltage.

In order to achieve the above-mentioned objects, the invention provides a plate-like battery pack comprising:
a plurality of single cell elements;
a flat battery pack case composed of an insulating material and adapted to have a plurality of holes respectively housing the single cell elements; and
a plurality of sealing plates adapted to hermetically seal the holes housing the single cell elements and connect adjacent ones of the single cell elements, and
the sealing plates connect the single cell elements in series, parallel or series-parallel.

It is preferable that openings of the holes positioned at one surface of the flat battery pack case are hermetically closed by at least one insulating member, and
the sealing plates are disposed at an opposite surface from the one surface of the flat battery pack case.

Preferably, the sealing plates include a top sealing plate adapted to hermetically seal the holes housing the single cell elements from a top side and a bottom sealing plate adapted to hermetically seal the holes housing the single cell elements from a bottom side, and
positive electrodes and negative electrodes of the single cell elements are alternately connected to either one of the top sealing plate and the bottom sealing plate.

Each of the single cell elements preferably constitutes a secondary battery or a lithium ion battery.

It is preferable that each of the sealing plates is a clad plate made of aluminum and copper as obtained by joining copper to a part of one surface of an aluminum plate, and
each of the positive electrodes of the single cell elements is connected to an aluminum portion of a corresponding one of the sealing plates and each of the negative electrodes of the single cell elements is connected to a copper portion of a corresponding one of the sealing plates.

It is preferable that each of the positive electrodes of the single cell elements is composed of an aluminum collector and joined to the aluminum portion of a corresponding one of the sealing plates by ultrasonic welding, and
each of the negative electrodes of the single cell elements is composed of a copper collector and joined to the copper portion of a corresponding one of the sealing plates by ultrasonic welding or resistance welding.

Preferably, each of the positive electrodes of the single cell elements is composed of an aluminum collector and mechanically connected to the aluminum portion of a corresponding one of the sealing plates.

It is preferable that the positive electrodes and part of the aluminum portions of the sealing plates mechanically connected to the positive electrodes are coated with a material which is stable at a positive electrode potential and excellent in contact conductivity.

It is preferable that each of the sealing plates is an aluminum plate, and
each of the positive electrodes of the single cell elements is composed of an aluminum collector and joined to an aluminum portion of a corresponding one of the sealing plates by ultrasonic welding, and
each of the negative electrodes of the single cell elements contains lithium titanate as an active material, has a collector made of aluminum, and is joined to another aluminum portion of the corresponding one of the sealing plates by ultrasonic welding.

It is preferable that a gasket adapted to hermetically seal each of the holes is disposed at each of the holes, and the gasket is pressed from top and bottom sides to thereby hermetically seal each of the holes.

Preferably, the plate-like battery pack further comprises a temperature controlling device, and the temperature controlling device is adapted to control temperature of at least one of the single cell elements by bringing fluid or an object into contact with a corresponding one of the sealing plates.

Preferably, the plate-like battery pack further comprises an equalization device adapted to equalize voltages and remaining capacities of the single cell elements.

Preferably, the plate-like battery pack further comprises a fuse.

Preferably, the plate-like battery pack further comprises a terminal adapted to be able to measure voltage of each of the single cell elements.

It is preferable that a nominal voltage is 65 V or less.

The invention provides a plate-like battery pack group having a plurality of the plate-like battery packs described above of at least one type that are connected in series, parallel or series-parallel by a connecting bridge, and the connecting bridge is disconnected in response to at least one of specified overload, excessive temperature, overvoltage and overcurrent to prevent the plate-like battery packs from becoming a high-voltage state.

According to the present invention, there can be provided a plate-like battery pack in which the bus bar is light in weight, the battery connection resistance is low, the assembly process is simple, the heat dissipation properties are excellent, and the handling is easy. Furthermore, according to the present invention, when a vehicle having the plate-like battery pack group mounted thereon is in an accident, the plate-like battery pack group is separated into individual plate-like battery packs by the impact of the accident, so that high-voltage electrical shock can be prevented.

DETAILED DESCRIPTION OF THE INVENTION

A battery pack and a battery pack group of the invention will be described below in detail with reference to preferred embodiments shown in the accompanying drawings.

Embodiment 1

Figure 1:
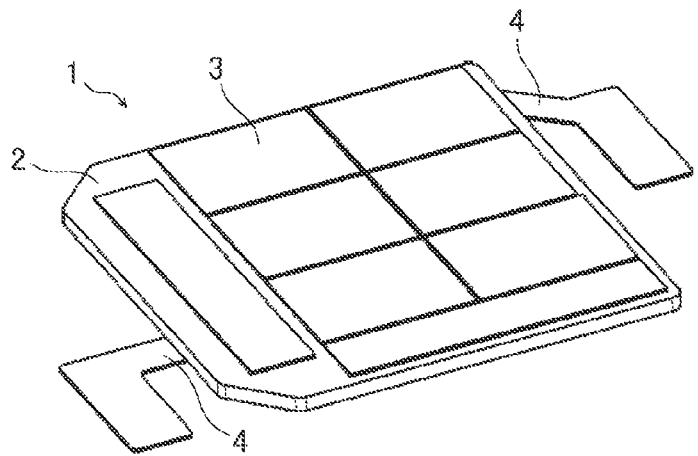
FIG. 1 is a structural view schematically showing a plate-like battery pack according to Embodiment 1 of the invention.
Figure 2:
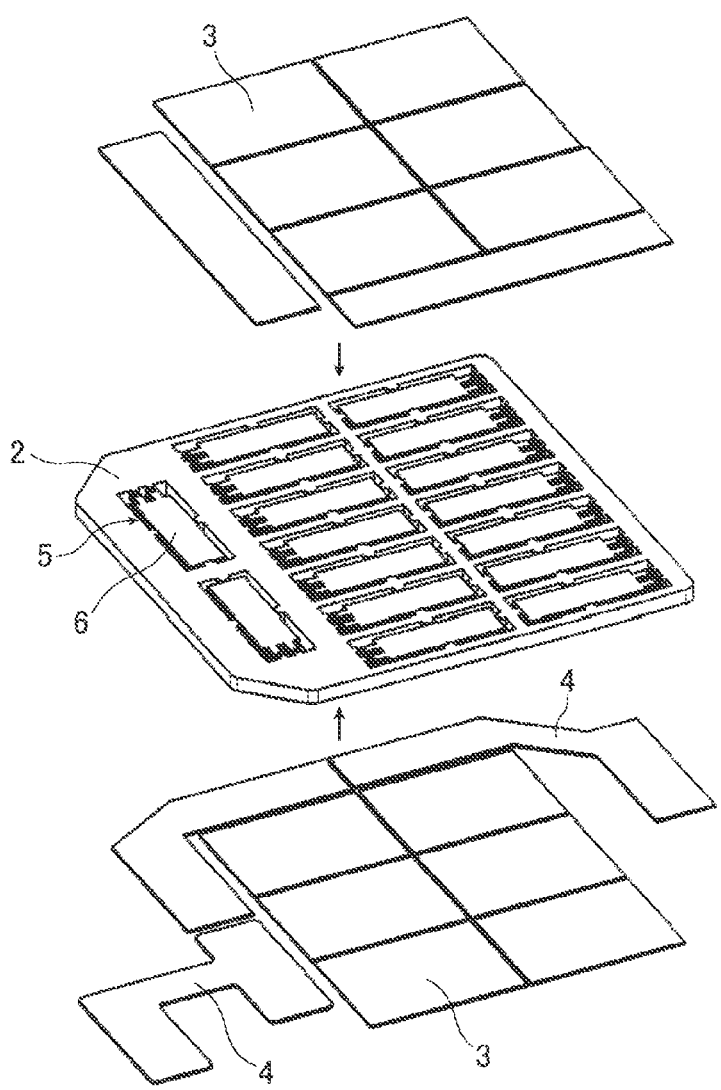
FIG. 2 is an explanatory, exploded assembly view of the plate-like battery pack shown in FIG. 1.

FIG. 1 is a perspective view showing the structure of a plate-like battery pack 1 according to Embodiment 1 of the invention and FIG. 2 is an explanatory, exploded assembly view of the plate-like battery pack 1. As shown in FIG. 1, the plate-like battery pack 1 includes a flat battery pack case 2, a plurality of top/bottom sealing plates 3 each adapted to cover the flat battery pack case 2 from its top or bottom, and connecting bridges 4 each adapted to connect the plate-like battery packs 1.

The flat battery pack case 2 has a plurality of holes 5 for housing a plurality of single cell elements 6 as shown in FIG. 2 and is made of an insulating material so as to ensure insulation properties for each single cell element 6. Examples of the insulating material include polypropylene-based synthetic resin, polycarbonate, epoxy-based resin and fluorine-based resin, which retain insulating properties even at high voltage exceeding 200 V. The number of holes 5 provided in the flat battery pack case 2 is sixteen.

Figure 3:
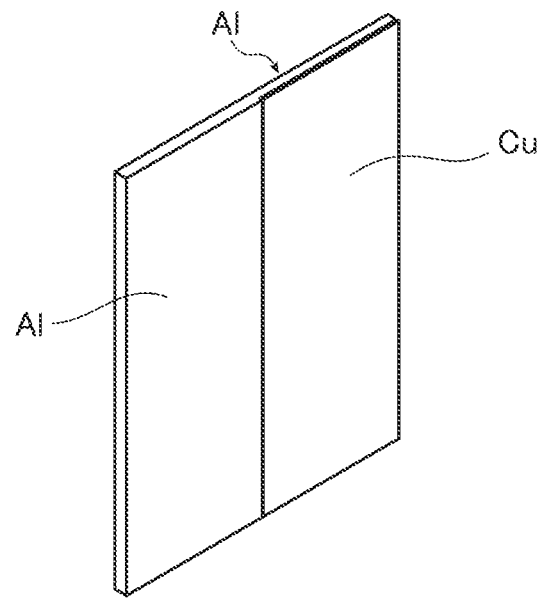
FIG. 3 is a schematic view showing an example of an top/bottom sealing plate of the plate-like battery pack shown in FIG. 1.

As shown in FIG. 3, the top/bottom sealing plate 3 is primarily made of aluminum and copper is joined to part of aluminum so that a two-layer plate made of aluminum and copper is formed. The top/bottom sealing plate 3 has a shape and size capable of covering two holes 5 in the flat battery pack case 2 when being disposed at the plate-like battery pack 1. A surface of the top/bottom sealing plate 3 facing outward is entirely made of aluminum and a surface thereof facing inward and used to hermetically close holes 5 that house single cell elements 6 is made of aluminum by about half and copper for the remaining portion. Accordingly, of two holes 5 to be covered by one top/bottom sealing plate 3, one is covered by the aluminum portion and the other one is covered by the copper portion.

The two-layer plate made of aluminum and copper may be a clad plate formed by pressure-welding or stamping copper with an aluminum plate, or may be formed by depositing copper on an aluminum plate by sputtering.

Preferably, the copper portion of the top/bottom sealing plate 3 has a size larger than the area of a hole 5 in which a single cell element 6 is disposed but not overlapping another hole 5 to be covered by the same top/bottom sealing plate 3. This is because, when the aluminum portion is exposed on the side of negative electrode of a single cell element 6, aluminum reacts with positive ions (e.g., lithium ions) of the single cell element 6 and this decreases the battery capacity and deteriorates the safety.

Furthermore, since the exposure of copper to a positive electrode potential causes copper to dissolve and this degrades the battery characteristics, copper of a top/bottom sealing plate 3 connected to the positive electrode should avoid contacting an electrolytic solution.

Figure 4:
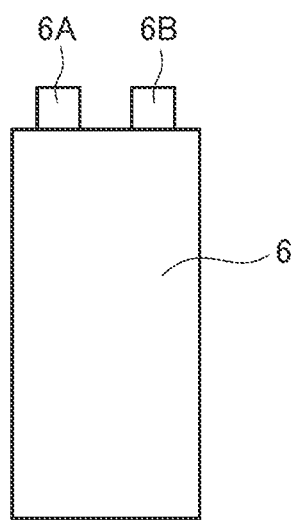
FIG. 4 is a front view of a secondary single cell element constituting the plate-like battery pack shown in FIG. 1.

FIG. 4 is a front view of a single cell element 6 to be disposed in a hole 5 of the flat battery pack case 2. The single cell element 6 is, for instance, a chargeable and dischargeable secondary single cell element and includes a positive electrode 6A using an aluminum collector and a negative electrode 6B using a copper collector. The single cell element 6 is not particularly limited as long as it is a flat single cell element or rolled-type elliptic single cell element that can be disposed in a hole 5. For example, a high-power lithium ion battery element or the like is preferred.

Figure 5:
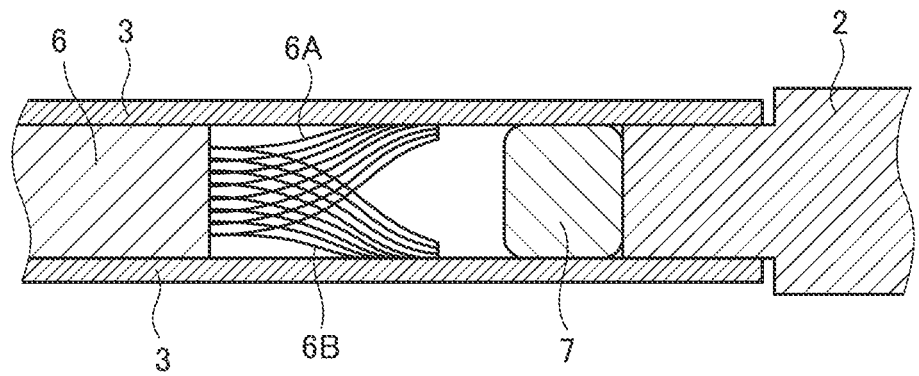
FIG. 5 is an enlarged cross-sectional view of the plate-like battery pack shown in FIG. 1.

FIG. 5 is an enlarged cross-sectional view showing a collector portion (positive electrode 6A and negative electrode 6B) of a single cell element 6 constituting the plate-like battery pack 1. As shown in FIG. 5, a single cell element 6 is disposed in a hole 5 of the flat battery pack case 2 and the hole 5 is hermetically sealed by top/bottom sealing plates 3, a gasket 7, an adhesive and the like. The positive electrode 6A using the aluminum collector is connected to the aluminum portion of the top/bottom sealing plate 3, and the negative electrode 6B using the copper collector is connected to the copper portion of the same. Aluminum and aluminum are joined together by, for instance, ultrasonic welding using ultrasonic waves, while copper and copper are joined together by, for instance, ultrasonic welding or resistance welding.

The top/bottom sealing plates 3 are installed to connect the single cell elements 6 disposed in the holes 5 in series. Accordingly, the top/bottom sealing plates 3 are arranged so that those covering the top of the holes 5 and those covering the bottom of the holes 5 are alternately placed to each properly cover two holes 5.

The connecting bridge 4 is used to connect plate-like battery packs 1 in series and serves as a connection terminal of a plate-like battery pack 1.

Next, the operation of the plate-like battery pack 1 according to Embodiment 1 of the invention will be explained.

The single cell element 6 is composed of, for example, a lithium ion battery element with a nominal voltage of 3.5 V. Sixteen single cell elements 6 respectively disposed in sixteen holes 5 are connected in series to constitute a plate-like battery pack with a nominal voltage of 56 V.

The plate-like battery pack 1 of the invention has the top and bottom surfaces whose most portions are covered by aluminum plates, i.e., the top/bottom sealing plates 3, and therefore is excellent in heat dissipation properties, whereby the battery pack 1 can prevent heat from remaining in its inside. Furthermore, since the top/bottom sealing plate 3 serves also as a bus bar, the battery connection resistance can be low and the plate-like battery pack 1 can be lighter in weight than a normal battery pack. Also, the single cell elements 6 are combined together by means of the flat battery pack case 2 and this makes the carrying, the installment and the like easier.

Embodiment 2

Figure 6:
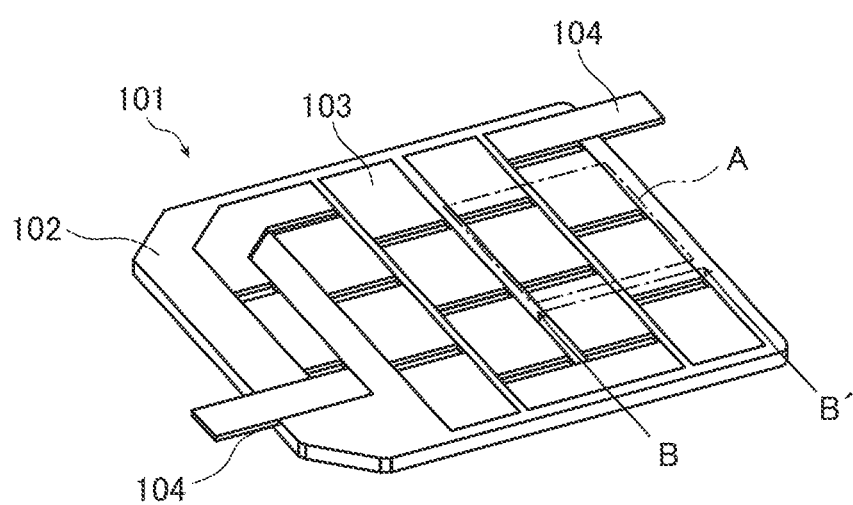
FIG. 6 is a structural view schematically showing a plate-like battery pack according to Embodiment 2 of the invention.
Figure 7:
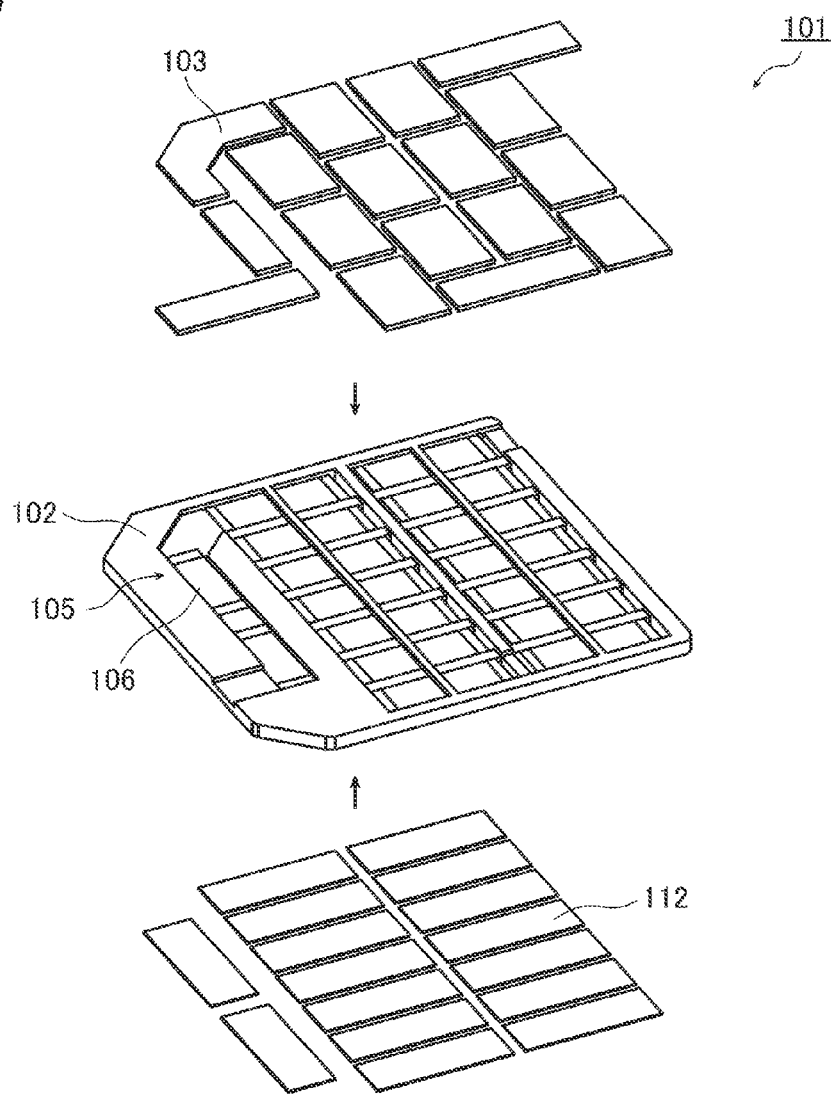
FIG. 7 is an explanatory, exploded assembly view of the plate-like battery pack shown in FIG. 6.

FIG. 6 is a perspective view showing the structure of a plate-like battery pack 101 according to Embodiment 2 of the invention and FIG. 7 is an explanatory, exploded assembly view of the plate-like battery pack 101. As shown in FIG. 6, the plate-like battery pack 101 includes a flat battery pack case 102, sealing plates 103 adapted to cover one surface of the flat battery pack case 102, and connecting bridges 104 each adapted to connect the plate-like battery packs 101.

The flat battery pack case 7 has a plurality of holes 105 for housing a plurality of single cell elements 106 as shown in FIG. 102 and is made of an insulating material so as to ensure insulation properties for each single cell element 106. The insulating material herein is the same as that in Embodiment 1. The number of holes 105 provided in the flat battery pack case 102 is sixteen.

Similarly to the top/bottom sealing plate in Embodiment 1, the sealing plate 103 is primarily made of aluminum and copper is joined to part of the aluminum so that a two-layer plate made of aluminum and copper is formed.

Figure 8:
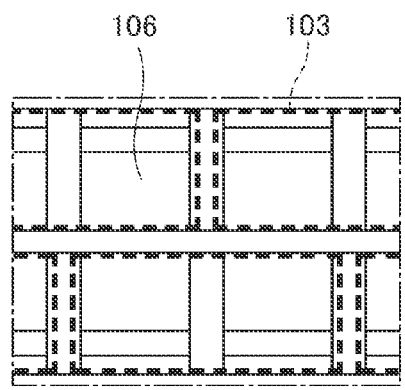
FIG. 8 is an enlarged transparent view of a part surrounded by dashed line A of the plate-like battery pack shown in FIG. 6.

FIG. 8 is an enlarged transparent view of a part surrounded by dashed line A of the plate-like battery pack 101 shown in FIG. 6. As shown in FIG. 8, the sealing plate 103 has a shape and size capable of covering halves of two holes 105 when being disposed at the flat battery pack case 102 of the plate-like battery pack 101. A surface of the sealing plate 103 facing outward is entirely made of aluminum and a surface thereof facing inward and used to hermetically close holes 5 that house single cell elements 106 is made of aluminum by about half and copper for the remaining portion in the same manner as the top/bottom sealing plate 3 of Embodiment 1. Accordingly, of halves of two holes 105 to be covered by one sealing plate 103, a half of one of the two holes 105 is covered by the aluminum portion and a half of the other one is covered by the copper portion.

Preferably, the surface of the sealing plate 103 made of copper and aluminum has a size slightly larger than the area of halves of two holes 105 in which single cell elements 6 are disposed but not overlapping the other halves of the two holes 105. This is because, as described in Embodiment 1, when the aluminum portion is exposed on the side of negative electrode of a single cell element 106, aluminum reacts with positive ions (e.g., lithium ions) of the single cell element 106 and this decreases the battery capacity and deteriorates the safety.

Furthermore, since the exposure of copper to a positive electrode potential causes copper to dissolve and this degrades the battery characteristics, copper of a sealing plate 103 connected to the positive electrode should avoid contacting an electrolytic solution, similarly to the case of Embodiment 1.

Openings of the holes 105 positioned at the other surface of the flat battery pack case 102 are sealed by insulating members 112. The insulating members 112 may be adhered to the holes 105 of the flat battery pack case 102 by an adhesive made of, for example, epoxy resin, or may be disposed at the flat battery pack case 102, followed by heating of the joint portions to carry out fusion bonding.

Figure 9:
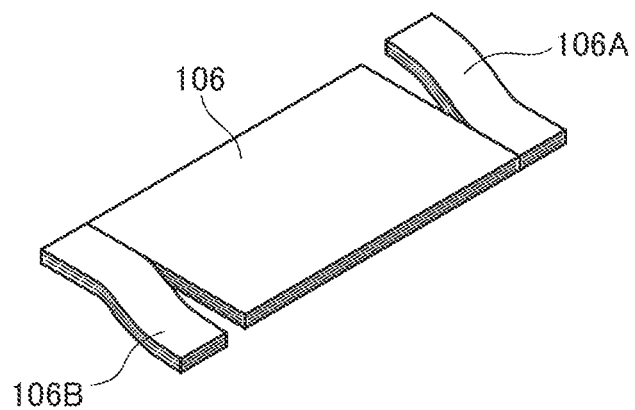
FIG. 9 is a perspective view of a secondary single cell element constituting the plate-like battery pack shown in FIG. 6.

FIG. 9 is a perspective view of a single cell element 106 to be disposed in a hole 105 of the flat battery pack case 102. The single cell element 106 is, for instance, a chargeable and dischargeable secondary single cell element similar to the single cell element 6 of Embodiment 1 but includes a positive electrode 106A using an aluminum collector and a negative electrode 106B using a copper collector which are different from those of the single cell element 6 of Embodiment 1 in shape and connected positions. The single cell element 106 is not particularly limited as long as it is a flat single cell element or rolled-type elliptic single cell element that can be disposed in a hole 105. For example, a high-power lithium ion battery element or the like is preferred.

Figure 10:
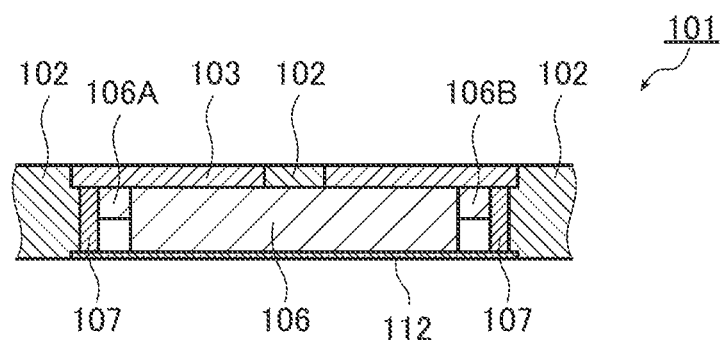
FIG. 10 is a cross-sectional view taken along line B-B' of the plate-like battery pack shown in FIG. 6.

FIG. 10 is a cross-sectional view taken along line B-B' of the plate-like battery pack 101 shown in FIG. 6. As shown in FIG. 10, a single cell element 106 is disposed in a hole 105 of the flat battery pack case 102 and the hole 105 is hermetically sealed by a sealing plate 103, an insulating member 112, a gasket 107, an adhesive and the like. The positive electrode 106A using the aluminum collector is connected to the aluminum portion of the sealing plate 103, and the negative electrode 106B using the copper collector is connected to the copper portion of the same. Aluminum and aluminum are joined together by, for instance, ultrasonic welding using ultrasonic waves, while copper and copper are joined together by, for instance, ultrasonic welding or resistance welding.

The sealing plates 103 are installed to connect the single cell elements 106 disposed in the holes 105 in series. Accordingly, the sealing plates 103 are alternately arranged so that they are displaced in the parallel direction so as to each cover halves of two holes 105.

The connecting bridge 104 is used to connect plate-like battery packs 101 in series and serves as a connection terminal of a plate-like battery pack 101.

Next, the operation of the plate-like battery pack 101 according to Embodiment 2 of the invention will be explained.

As in Embodiment 1, the single cell element 106 is composed of, for example, a lithium ion battery element with a nominal voltage of 3.5 V. Sixteen single cell elements 106 respectively disposed in sixteen holes 105 are connected in series to constitute a plate-like battery pack with a nominal voltage of 56 V.

Figure 11:
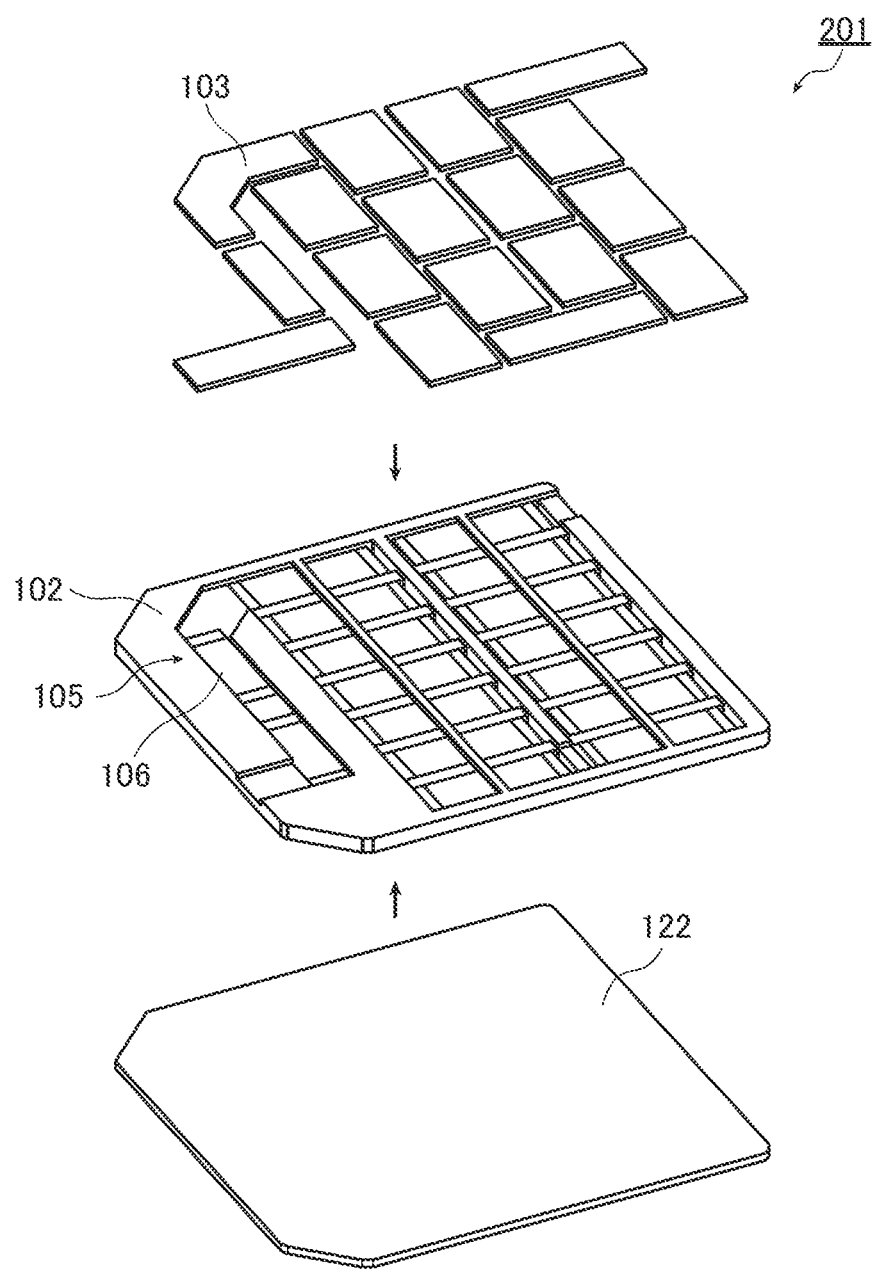
FIG. 11 is an explanatory, exploded assembly view of a plate-like battery pack according to an alternative example of Embodiment 2 of the invention.
Figure 12:
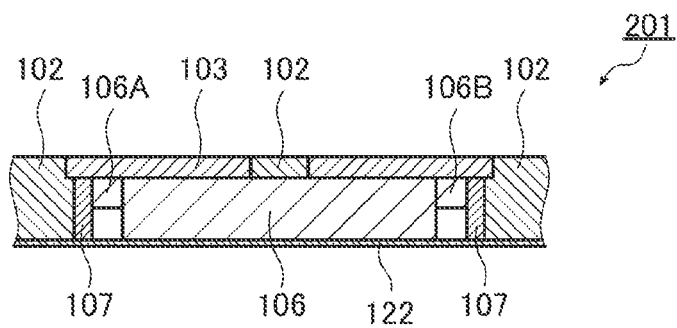
FIG. 12 is a cross-sectional view of a hole of the plate-like battery pack shown in FIG. 11.

FIG. 11 is an explanatory, exploded assembly view of a plate-like battery pack 201 according to an alternative example of Embodiment 2 of the invention and FIG. 12 is a cross-sectional view of a hole 105 of the plate-like battery pack 201. The difference between the plate-like battery pack 101 of Embodiment 2 and the plate-like battery pack 201 of the alternative example thereof is the configuration of the insulating member for sealing the holes 105.

While the insulating member 112 of the plate-like battery pack 101 seals each of the holes 105 of the flat battery pack case 102 one by one, an insulating member 122 of the plate-like battery pack 201 seals all of the holes 105 of the flat battery pack case 102 at a time. Similarly to the insulating member 112 of Embodiment 2, the insulating member 122 may be adhered to the flat battery pack case 102 by an adhesive made of, for example, epoxy resin, or may be disposed at the flat battery pack case 102, followed by heating or the like to be fusion-bonded with the flat battery pack case 102.

The plate-like battery pack 101 according to Embodiment 2 and the plate-like battery pack 201 of the alternative example of Embodiment 2 each have a surface whose most portion is covered by aluminum plates, i.e., the sealing plates 103 similarly to the plate-like battery pack 1 of Embodiment 1, and therefore is excellent in heat dissipation properties, whereby the battery packs 101 and 201 can prevent heat from remaining in its inside. Furthermore, since the sealing plate 103 serves also as a bus bar, the battery connection resistance can be low and the plate-like battery packs 101 and 201 can be lighter in weight than a normal battery pack. In addition, the configuration to provide the sealing plates 103 only at one surface of the battery pack 101 or 201 enables to achieve a further lighter weight than the plate-like battery pack 1 of Embodiment 1. Also, the single cell elements 106 are combined together by means of the flat battery pack case 102 and this makes the carrying, the installment and the like easier.

Embodiment 3

Figure 13:
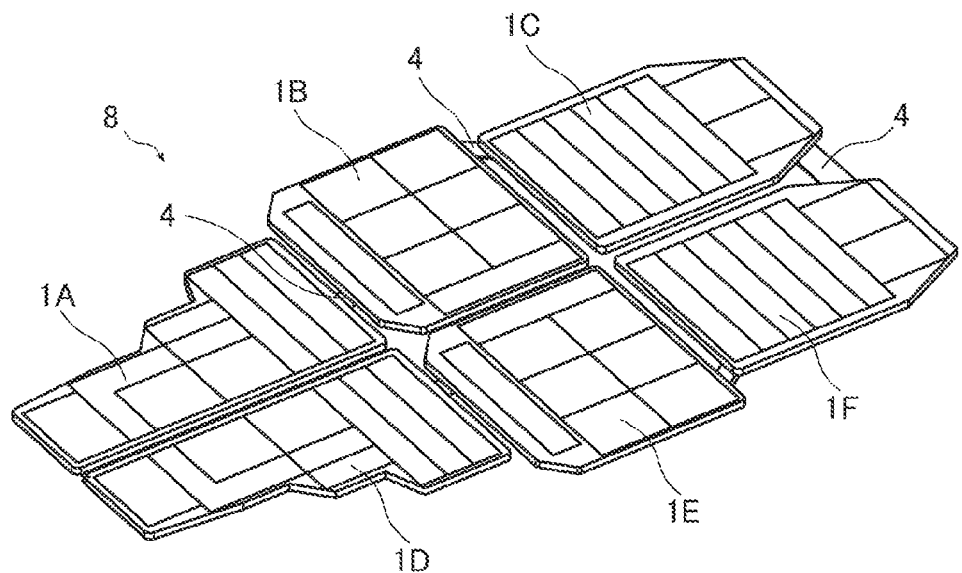
FIG. 13 is a structural view schematically showing a plate-like battery pack group according to Embodiment 3 of the invention.

FIG. 13 is a structural view schematically showing a plate-like battery pack group 8 according to Embodiment 3 of the invention. The plate-like battery pack group 8 includes a first plate-like battery pack 1A, a second plate-like battery pack 1B, a third plate-like battery pack 1C, a fourth plate-like battery pack 1D, a fifth plate-like battery pack 1E and a sixth plate-like battery pack 1F that are connected by connecting bridges 4. Those plate-like battery packs 1 have the same configuration as the plate-like battery pack of Embodiment 1 in terms of having sixteen holes 5 and sixteen single cell elements 6 being connected in series although the battery packs 1 slightly differ from the battery pack 1 of Embodiment 1 in shape of accompanying flat battery pack case 2.

The connecting bridges 4 serially connect the plate-like battery packs 1A to 1F in series and are disconnected in response to specific overload, excessive temperature, overvoltage or overcurrent.

Next, the operation of the plate-like battery pack group 8 according to Embodiment 3 of the invention will be explained.

The first to sixth plate-like battery packs 1A to 1F each have a nominal voltage of 56 V and accordingly, the plate-like battery pack group 8 is a high-voltage battery pack group with a nominal voltage of 336 V.

The plate-like battery pack group 8 may be installed as a power source under floor of a vehicle such as an electric vehicle and a hybrid vehicle, and can output a high voltage of 336 V.

In the case that a vehicle on which the plate-like battery pack group 8 is mounted is involved in an accident or the like and is damaged, the first to sixth plate-like battery packs 1A to 1F constituting the plate-like battery pack group 8 are separately moved so that the connecting bridges 4 serially-connecting the first to sixth plate-like battery packs 1A to 1F constituting the plate-like battery pack group 8 are each disconnected and consequently the plate-like battery packs 1A to 1F are separated from each other. It should be noted the maximum DC voltage that can be safely handled is generally considered as 65 V or less and therefore the maximum voltage of the plate-like battery pack 1 is preferably set to DC 65 V or less.

As a result, the high-voltage state of the plate-like battery pack group 8 can be eliminated (i.e., the voltage can fall to 65 V or less), so that even if a person experiences an electrical shock caused by the plate-like battery pack on the vehicle involved in an accident, the person will not be killed.

The connecting bridges 4 may each have a cut to facilitate the disconnection upon received impact, or have a spring mechanism or the like that operates in response to excessive temperature or impact to trigger the disconnection. Alternatively, an FET switch having an electric circuit composed of a sensor or an IC may be provided to cause the connecting bridges 4 to be disconnected in response to, for instance, specified overload, excessive temperature, overvoltage or overcurrent.

It should be noted that, while each of the plate-like battery packs 1 constituting the plate-like battery pack group 8 of Embodiment 3 is equivalent to the battery pack of Embodiment 1, the plate-like battery pack 101 of Embodiment 2 or the plate-like battery pack 201 of the alternative example thereof may instead be used. In this case, the same effects as the case of using the plate-like battery pack 1 can be achieved.

Figure 14:
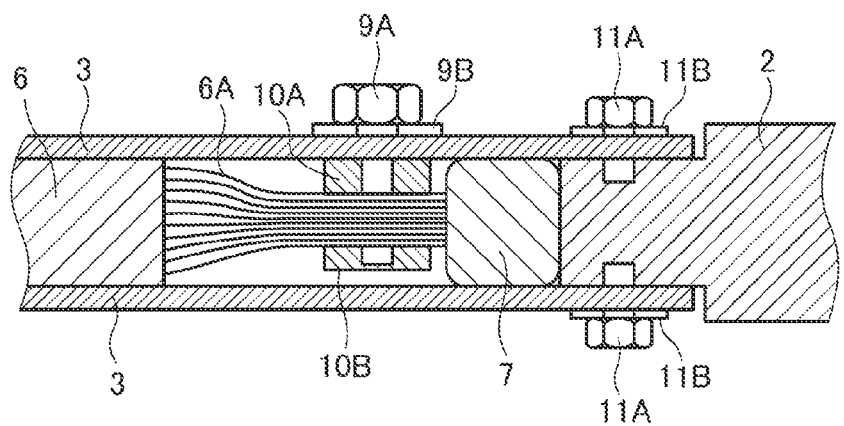
FIG. 14 is an enlarged cross-sectional view of a plate-like battery pack according to a first alternative example of Embodiment 1 of the invention.

FIG. 14 is an enlarged cross-sectional view of a plate-like battery pack according to a first alternative example of Embodiment 1 of the invention. In FIG. 14, the positive electrode 6A composed of the aluminum collector of the single cell element 6 and the aluminum portion of the top/bottom sealing plate 3 are connected not by ultrasonic welding but by mechanical means such as screws. This mechanical connection is established with a tab fastening bolt 9A, a tab fastening washer 9B, a first tab sandwiching member 10A and a second tab sandwiching member 10B, and is configured by boring holes in a sealing plate 3 covering the top and the positive electrode 6A, sandwiching the positive electrode 6A between the first tab sandwiching member 10A and the second tab sandwiching member 10B, and fastening the positive electrode 6A by the tab fastening bolt 9A and the tab fastening washer 9B.

The mechanical connection shown in FIG. 14 is one example and any configuration may be employed as long as the top/bottom sealing plate 3 and the positive electrode 6A composed of the aluminum collector are electrically connected to each other.

While the top/bottom sealing plate 3 is adhered to the flat battery pack case 2 by an adhesive or the like in the foregoing, the top/bottom sealing plate 3 may be, for instance, mechanically connected to the flat battery pack case 2 by a plate fastening bolt 11A and a plate fastening washer 11B. An electrolytic solution may be poured before closing a hole 5 with the top/bottom sealing plate, or a pouring port which is independently provided may be hermetically closed after an electrolytic solution is poured.

It should be noted that the above fastening configuration using screws can be adopted for the plate-like battery pack 101 of Embodiment 2 and the plate-like battery pack 201 of the alternative example thereof.

Figure 15:
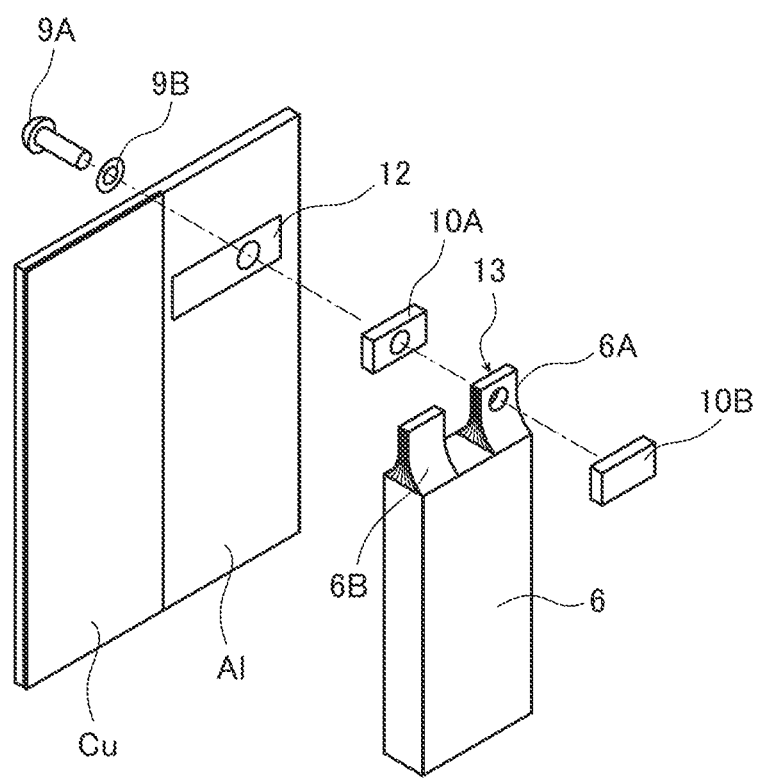
FIG. 15 is a partial exploded assembly view of a plate-like battery pack according to a second alternative example of Embodiment 1 of the invention.

FIG. 15 is an explanatory, exploded assembly view of a plate-like battery pack according to a second alternative example of Embodiment 1. As shown in FIG. 15, a first coating region 12 may be formed at part of the aluminum portion of the top/bottom sealing plate 3 as well as forming a second coating region 13 at part of the positive electrode 6A composed of the aluminum collector, thereby improving the contact stability between aluminum and aluminum.

In this case, a metal or a material such as gold and carbon which is stable at the positive electrode potential and excellent in the contact conductivity is applied to the first coating region 12 and the second coating region 13 by sputtering or the like.

While copper is coated on part of one surface of the top/bottom sealing plate 3 of Embodiment 1 and the first and second alternative examples thereof in order to be connected to the negative electrode 6B composed of the copper collector of the single cell element 6, when the negative electrode 6B of the single cell element 6 is made of lithium titanate active material, an aluminum collector can be used for the negative electrode 6B so that the aluminum collector and the aluminum portion of the top/bottom sealing plate 3 are directly connected without copper coated on the top/bottom sealing plate 3. The potential of lithium titanate is higher than the reaction potential of aluminum and lithium ions, so that a collector made of aluminum does not react with lithium ions. In this case, the connection of the negative electrode 6B having the negative collector made of aluminum with the aluminum portion of the top/bottom sealing plate 3 is established by, for example, ultrasonic welding.

It should be noted that the above configuration of the collector and the sealing plate can be adopted for the plate-like battery pack 101 of Embodiment 2 and the plate-like battery pack 201 of the alternative example thereof.

While the plate-like battery packs 1, 101 and 201 according to Embodiment 1 or 2 each contain the single cell elements that are connected in series by the sealing plates serving also as bus bars, the single cell elements may be connected in parallel or series-parallel.

The plate-like battery packs 1, 101 and 102 according to Embodiment 1 or 2 may each have a temperature regulating device adapted to regulate the temperature of the single cell element 6 by bringing fluid or an object into contact with a surface of the plate-like battery pack on which the sealing plate is disposed.

The plate-like battery packs 1, 101 and 102 of Embodiment 1 or 2 each have the surface of a large area in contact with the fluid or object, resulting in the excellent heat dissipation properties.

The plate-like battery packs 1, 101 and 102 according to Embodiment 1 or 2 may each have an equalization circuit adapted to equalize voltages and remaining capacities of the single cell elements. The provision of the equalization circuit can lead to a longer life of the single cell elements serving as secondary batteries.

In order to avoid the risk of ignition or the like caused by applied high voltage, the plate-like battery packs 1, 101 and 102 according to Embodiment 1 or 2 may each have a fuse, or may each have a terminal for voltage measurement corresponding to each single cell element so as to measure voltage of each single cell element constituting the plate-like battery pack. For example, sealing plates serving also as bus bars may be configured to be terminal sections used to connect the flat battery pack case to an external circuit at both ends of the series-connected or parallel-connected single cell elements in the plate-like battery pack.

The plate-like battery pack group 8 according to Embodiment 3 may have the above temperature regulating device, equalization circuit, fuse, voltage measurement device and the like as well.

The plate-like battery pack group 8 according to Embodiment 3 may have a plurality of the plate-like battery packs 1, 101 or 201 connected in series, parallel or series-parallel by the connecting bridges 4 so that the plate-like battery packs 1, 101 or 201 are arranged on a plane surface so as to be installed, for instance, under floor of a vehicle. The plate-like battery pack group 8 may be composed of several plate-like battery packs 1, 101 or 201 stacked via a device or structure having a temperature regulating function such as an air passage and a coolant system.

While the plate-like battery pack and the plate-like battery pack group according to the invention have been described above in detail, the invention is by no means limited to the above embodiments, and various improvements and modifications may be made without departing from the scope and spirit of the invention.

What is claimed is:

1. A plate-like battery pack comprising:
a plurality of single cell elements;
a flat battery pack case composed of an insulating material and adapted to have a plurality of holes respectively housing the single cell elements; and
a plurality of sealing plates adapted to hermetically seal the holes housing the single cell elements and connect adjacent ones of the single cell elements,
wherein the sealing plates connect the single cell elements in series, parallel or series-parallel.

2. The plate-like battery pack according to claim 1, wherein openings of the holes positioned at one surface of the flat battery pack case are hermetically closed by at least one insulating member; and
wherein the sealing plates are disposed at an opposite surface from the one surface of the flat battery pack case.

3. The plate-like battery pack according to claim 1, wherein the sealing plates include a top sealing plate adapted to hermetically seal the holes housing the single cell elements from a top side and a bottom sealing plate adapted to hermetically seal the holes housing the single cell elements from a bottom side; and
wherein positive electrodes and negative electrodes of the single cell elements are alternately connected to either one of the top sealing plate and the bottom sealing plate.

4. The plate-like battery pack according to claim 1, wherein each of the single cell elements constitutes a secondary battery.

5. The plate-like battery pack according to claim 1, wherein each of the single cell elements constitutes a lithium ion battery.

6. The plate-like battery pack according to claim 1, wherein each of the sealing plates is a clad plate made of aluminum and copper as obtained by joining copper to a part of one surface of an aluminum plate; and
  wherein each of the positive electrodes of the single cell elements is connected to an aluminum portion of a corresponding one of the sealing plates and each of the negative electrodes of the single cell elements is connected to a copper portion of a corresponding one of the sealing plates.

7. The plate-like battery pack according to claim 6, wherein each of the positive electrodes of the single cell elements is composed of an aluminum collector and joined to the aluminum portion of a corresponding one of the sealing plates by ultrasonic welding; and
  wherein each of the negative electrodes of the single cell elements is composed of a copper collector and joined to the copper portion of a corresponding one of the sealing plates by ultrasonic welding or resistance welding.

8. The plate-like battery pack according to claim 6, wherein each of the positive electrodes of the single cell elements is composed of an aluminum collector and mechanically connected to the aluminum portion of a corresponding one of the sealing plates.

9. The plate-like battery pack according to claim 8, wherein the positive electrodes and part of the aluminum portions of the sealing plates mechanically connected to the positive electrodes are coated with a material which is stable at a positive electrode potential and excellent in contact conductivity.

10. The plate-like battery pack according to claim 1, wherein each of the sealing plates is an aluminum plate;
  wherein each of the positive electrodes of the single cell elements is composed of an aluminum collector and joined to an aluminum portion of a corresponding one of the sealing plates by ultrasonic welding; and
  wherein each of the negative electrodes of the single cell elements contains lithium titanate as an active material, has a collector made of aluminum, and is joined to another aluminum portion of the corresponding one of the sealing plates by ultrasonic welding.

11. The plate-like battery pack according to claim 1, wherein a gasket adapted to hermetically seal each of the holes is disposed at each of the holes, and the gasket is pressed from top and bottom sides to thereby hermetically seal each of the holes.

12. The plate-like battery pack according to claim 1, further comprising a temperature controlling device,
  wherein the temperature controlling device is adapted to control temperature of at least one of the single cell elements by bringing fluid or an object into contact with a corresponding one of the sealing plates.

13. The plate-like battery pack according to claim 1, further comprising an equalization device adapted to equalize voltages and remaining capacities of the single cell elements.

14. The plate-like battery pack according to claim 1, further comprising a fuse.

15. The plate-like battery pack according to claim 1, further comprising a terminal adapted to be able to measure voltage of each of the single cell elements.

16. The plate-like battery pack according to claim 1, wherein a nominal voltage is 65 V or less.

17. A plate-like battery pack group having a plurality of the plate-like battery packs according to claim 1 of at least one type that are connected in series, parallel or series-parallel by a connecting bridge,
  and the connecting bridge is disconnected in response to at least one of specified overload, excessive temperature, overvoltage and overcurrent to prevent the plate-like battery packs from becoming a high-voltage state.

18. A plate-like battery pack group having a plurality of the plate-like battery packs according to claim 2 of at least one type that are connected in series, parallel or series-parallel by a connecting bridge,
  and the connecting bridge is disconnected in response to at least one of specified overload, excessive temperature, overvoltage and overcurrent to prevent the plate-like battery packs from becoming a high-voltage state.

19. A plate-like battery pack group having a plurality of the plate-like battery packs according to claim 3 of at least one type that are connected in series, parallel or series-parallel by a connecting bridge,
  and the connecting bridge is disconnected in response to at least one of specified overload, excessive temperature, overvoltage and overcurrent to prevent the plate-like battery packs from becoming a high-voltage state.

* * * * *